(12) United States Patent
Imine

(10) Patent No.: US 8,553,274 B2
(45) Date of Patent: Oct. 8, 2013

(54) IMAGE PROCESSING APPARATUS, METHOD FOR CONTROLLING THE SAME, AND STORAGE MEDIUM

(75) Inventor: Ryotaro Imine, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 344 days.

(21) Appl. No.: 12/891,654

(22) Filed: Sep. 27, 2010

(65) Prior Publication Data

US 2011/0075187 A1    Mar. 31, 2011

(30) Foreign Application Priority Data

Sep. 29, 2009   (JP) ................................. 2009-224279

(51) Int. Cl.
   *G06K 15/00*   (2006.01)
(52) U.S. Cl.
   USPC ........ 358/1.18; 358/1.13; 358/1.14; 358/1.15
(58) Field of Classification Search
   USPC ......... 358/1.13, 1.9, 1.18, 1.14, 47; 715/255, 715/251, 253
   See application file for complete search history.

(56) References Cited

U.S. PATENT DOCUMENTS

| | | | |
|---|---|---|---|
| 7,085,019 B2* | 8/2006 | Yoshida et al. | 358/405 |
| 7,394,562 B2* | 7/2008 | Nakagiri et al. | 358/1.18 |
| 7,474,424 B2* | 1/2009 | Hokiyama | 358/1.15 |
| 8,098,395 B2* | 1/2012 | Kitada et al. | 358/1.18 |
| 8,159,711 B2* | 4/2012 | Oshima | 358/1.18 |
| 2002/0184324 A1* | 12/2002 | Carlin et al. | 709/206 |
| 2003/0056177 A1* | 3/2003 | Nara et al. | 715/525 |
| 2005/0094208 A1* | 5/2005 | Mori | 358/1.18 |
| 2005/0243372 A1* | 11/2005 | Sato et al. | 358/1.18 |
| 2005/0283720 A1* | 12/2005 | Warmus et al. | 715/517 |
| 2010/0110483 A1* | 5/2010 | Igarashi | 358/1.15 |
| 2010/0271645 A1* | 10/2010 | Nakabayashi | 358/1.9 |

FOREIGN PATENT DOCUMENTS

JP        10-229484 A       8/1998

* cited by examiner

*Primary Examiner* — Twyler Haskins
*Assistant Examiner* — Dennis Dicker
(74) *Attorney, Agent, or Firm* — Canon USA, Inc., IP Division

(57) ABSTRACT

To delete unnecessary blank page(s) without changing a desired output layout requested by a user, a CPU of a controller unit sets fixed page image data, as image data of a plurality of consecutive pages whose relationship is to be fixed, among image data of a plurality of pages of a document read by a scanner unit. Further, the CPU detects image data corresponding to blank page(s) from the image data of the plurality of pages, and counts the number of pages of image data corresponding to the blank pages existing between the fixed page image data. Then, to determine an output layout of image data, the CPU deletes image data corresponding to all blank pages existing between the fixed page image data if the number of pages is an even number, and the CPU deletes image data corresponding to an even number of blank pages that are present between the fixed page image data if the number of pages is an odd number.

7 Claims, 13 Drawing Sheets

```
1401                                                1404
┌──────────────────────────────────────────────────────┐
│ BLANK PAPER DETECTION MESSAGE                        │
│                                                      │
│   THE NUMBER OF DETECTED BLANK PAGE(S) IS AN ODD NUMBER. │
│                                                      │
│   DELETION OF ALL DETECTED BLANK PAGE(S) IS ACCEPTABLE ? │
│   IF ANSWER = YES, THEN PRESS "OK" BUTTON.           │
│                                                      │
│              ┌─────────┐                             │
│              │   OK    │ ──1402                      │
│              └─────────┘                             │
│                                                      │
│   IF THERE IS ANY PAGE(S) TO BE FIXED, THEN PRESS THE│
│   FOLLOWING BUTTON.                                  │
│                                                      │
│                                                      │
│         ┌──────────────────────────────┐             │
│         │ DESIGNATE PAGE(S) TO BE FIXED│──1403       │
│         └──────────────────────────────┘             │
└──────────────────────────────────────────────────────┘
```

IMAGE PROCESSING APPARATUS, METHOD FOR CONTROLLING THE SAME, AND STORAGE MEDIUM

BACKGROUND OF THE INVENTION

1. Field of the Invention

The present invention relates to a technique for controlling an image forming apparatus that can perform print output processing based on image data read from a document.

2. Description of the Related Art

From the viewpoint of effective use of resources, there is a conventional image forming apparatus that can delete any blank page(s) if included in a read document to prevent useless recording of blank page(s) or prevent useless print output of the blank page(s).

A conventional image forming apparatus discussed in Japanese Patent Application Laid-Open No. 10-229484 has an automatic blank page deletion function, which is capable of detecting a blank page included in a read image and deleting image data corresponding to the detected blank page.

On the other hand, in many cases, when users of the apparatus use document sheets for copying operations, it is desired to determine the print output layout by fixing the relationship between consecutive pages of a document image, such as a mutual relationship between front and back surfaces of a document sheet or a mutual relationship between right and left pages in an opened state in a bookbinding printing.

Therefore, if the conventional image forming apparatus deletes blank pages according to the blank page deletion function, page numbers of respective pages may change undesirably. For example, pages to be printed on the front and back surfaces of a same sheet may be separately printed on different sheets. Further, pages to be printed on the right and left (or upper and lower) sides in an open layout may be erroneously printed on the front and back surfaces of a print sheet.

For example, in a case where two-sided printing of a two-sided document is performed, if a specific one page is deleted, the page numbers of the following pages are decremented by one. As a result, odd page numbers are changed to even page numbers and even page numbers are changed to odd page numbers. More specifically, in such a case, the page image previously positioned on the front (rear) surface of a document is printed on a rear (front) surface of a print sheet.

Further, the page image previously positioned on the right (left) side of an opened-state document is printed as a left (right) page of a print sheet in an opened state. Moreover, the page image previously positioned on the upper (lower) side of an opened-state document is printed as a lower (upper) page of a print sheet in an opened state.

As described above, depending on the number of pages to be deleted or an output layout method, users of the image forming apparatus may not be able to obtain printed output results as intended.

SUMMARY OF THE INVENTION

The present invention is directed to an image processing apparatus enabling users to delete blank pages without changing a desired relationship between consecutive pages and obtaining output results intended by the users while considering effective use of resources.

According to an aspect to the present invention, an image processing apparatus includes an input unit configured to input image data of a plurality of pages; a setting unit configured to set fixed page image data, as image data of a plurality of consecutive pages whose relationship is to be fixed, among the image data input by the input unit; a calculation unit configured to calculate a number of pages of image data corresponding to blank pages that are present between the fixed page image data; and a control unit configured to prevent image data corresponding to all blank pages existing between the fixed page image data from being printed when the number of pages calculated by the calculation unit is an even number, and prevent image data corresponding to an even number of blank pages exiting between the fixed page image data from being printed when the number of pages calculated by the calculation unit is an odd number.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

<Cross-Sectional View of Image Forming Apparatus>

Figure 1:
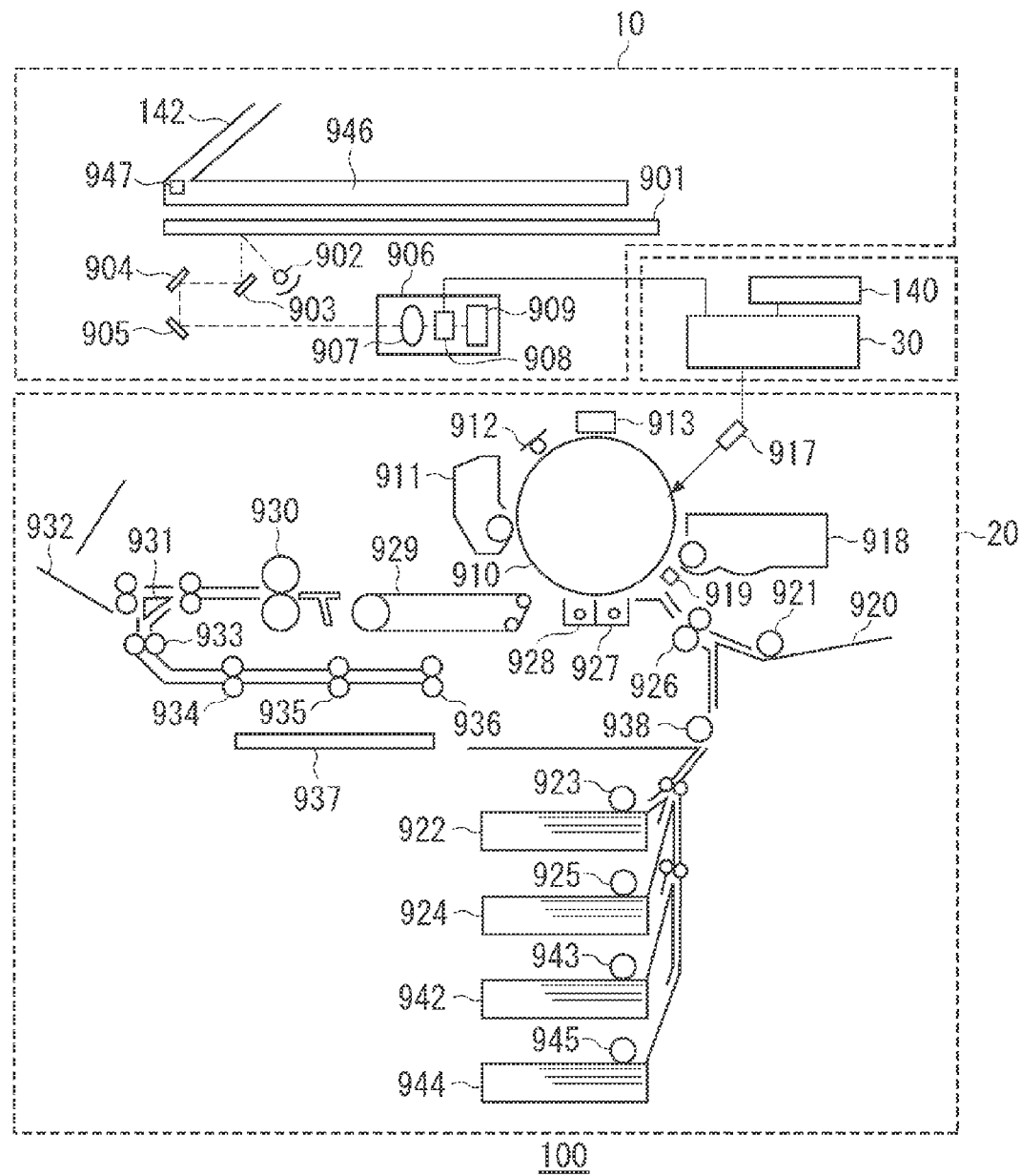
FIG. 1 is a cross-sectional view illustrating a configuration of an image forming apparatus according to an exemplary embodiment of the present invention.

FIG. 1 illustrates a cross-sectional view of an example configuration of an image forming apparatus according to an exemplary embodiment of the present invention. An example configuration and operations of the image forming apparatus are described below.

An image forming apparatus 100 illustrated in FIG. 1 includes a scanner device 10, a printer device 20, a controller unit 30, and an operation device 140. The scanner device 10 is functionally operable as a document reading device. The printer device 20 is functionally operable as an image output device. The controller unit 30 can control image forming processing and various operations that can be performed by the image forming apparatus 100. The operation device 140 is functionally operable as a user interface.

The scanner device 10 includes an automatic document feeder (ADF) 142. If an operator of the image forming apparatus 100 places a document (original) sheet on the ADF 142 and operates the operation device 140 to instruct starting processing for reading document, the controller unit 30 starts an image forming operation. In the image forming operation, the ADF 142 successively feeds document sheets while performing a control for frictionally separating the document sheets set on the ADF 142 according to a retard method so as to prevent any miss feeding of the document sheets.

The documents successively fed from the ADF 142 are stopped at a predetermined position on a document positioning glass plate 901. A document size sensor 947 can detect a rear edge of each document fed from the ADF 142 to the document positioning glass plate 901 and sends a detection signal to the controller unit 30. A document placed on the document positioning glass plate 901 can be exposed with light emitted from a document illumination lamp 902, which is, for example, constituted by a halogen lamp.

Three scanning mirrors 903, 904, and 905 are housed in an optical scanning unit (not illustrated), which can move in a back and forth direction to guide reflection light from the document toward a charge coupled device (CCD) unit 906. The CCD unit 906 includes an image-forming lens 907, an image sensor 908, and a CCD driver 909. The reflection light from the document passes through the image-forming lens 907 and forms a document image on the image sensor 908. The image sensor 908 can be, for example, constituted by a CCD. The CCD driver 909 can drive the image sensor 908. An image signal detected by the image sensor 908 is converted, for example, into 8-bit digital data. The controller unit 30 receives the 8-bit digital data sent from the image sensor 908.

The ADF 142 can reverse a document sheet that is once read by the scanner device 10 and re-feed the document sheet. In other words, the scanner device 10 can read the front and back surfaces of the document sheet. As another exemplary embodiment, the scanner device 10 may be configured to simultaneously read the front and back surfaces of the document sheet.

The scanner device 10 can read an image of one surface of a document sheet that corresponds to one page and can obtain image data of a plurality of pages that constitute a document. More specifically, the scanner device 10 reads images from at least one of the front and back surfaces of the plurality of document sheets and inputs the read image data (i.e., image data of a plurality of pages) to the controller unit 30. The controller unit 30 stores the image data of a plurality of pages received from the scanner device 10 in a hard disk drive (HDD) 1204 (see FIG. 2) and then performs image processing on the image data.

The printer device 20 includes a photosensitive drum 910 associated with a pre-exposure lamp 912. The pre-exposure lamp 912 can remove residual electric charges from the surface of the photosensitive drum 910 for image forming processing. A primary charging device 913 can uniformly charge the surface of the photosensitive drum 910. An exposure device 917 is, for example, constructed by a semiconductor laser. The exposure device 917 can emit light based on image data processed by the controller unit 30. The photosensitive drum 910 is exposed with the light emitted from the exposure device 917 and forms an electrostatic latent image on its surface.

A development unit 918 stores a black-color toner. A pre-transfer charging device 919 can apply a high voltage to a toner image developed on the photosensitive drum 910 before the image is transferred onto a sheet. The printer device 20 includes a plurality of built-in paper feeding units 922, 924, 942, and 944 in addition to a manual paper feeding unit 920. A plurality of paper feeding rollers 921, 923, 925, 943, and 945, which are associated with respective paper feeding units 920, 922, 924, 942, and 944, can be driven to feed a transfer sheet toward the photosensitive drum 910. The fed transfer sheet is once stopped at a delivery position regulated by a registration roller 926, and is re-fed in synchronization with the position of the image formed on the photosensitive drum 910.

In this case, the sheets are separated and conveyed one after another by a retard roller controlled according to a conventionally known frictional separation method without being fed in an overlapped manner. Further, it is useful to control the rotation of the retard roller considering the type of a sheet, and stop the sheet separation control and convey the sheet.

A transfer charging device 927 can transfer the toner image developed on the photosensitive drum 910 to a transfer sheet that is conveyed along a conveyance path. A separation charging device 928 can separate the transfer sheet, after the above-described transfer operation is completed, from the photosensitive drum 910. A cleaner 911 can collect the toner remaining on the photosensitive drum 910.

A conveyance belt 929 can convey the processing completed transfer sheet to a fixing device 930. The fixing device 930 performs, for example, a thermal fixing operation.

A flapper 931 can control a conveyance path of the fixing processing completed transfer sheet, which is switchable between a sorter 932 and an intermediate tray 937. A plurality of paper feeding rollers 933 to 936 can guide the fixing processing completed transfer sheet to the intermediate tray 937 in a reversed (multiplexed) or non-reversed (two-sided) state. A re-feeding roller 938 can convey the transfer sheet placed on the intermediate tray 937 to the delivery position regulated by the registration roller 926.

The controller unit 30 includes a microcomputer and an image processing unit that are described below in detail. The controller unit 30 can perform the image forming operation according to instructions given from the operation device 140.

Although not illustrated in detail, the operation device 140 includes a liquid crystal operation panel and various hard keys. The liquid crystal operation panel is a touch panel combined with a liquid crystal display device.

The image forming apparatus according to the present exemplary embodiment illustrated in FIG. 1 is a monochrome image forming apparatus. However, the image forming apparatus according to the present invention is not limited to the monochrome type and can be configured as a color image forming apparatus.

The image forming apparatus according to the present exemplary embodiment illustrated in FIG. 1 is an electrophotographic image forming apparatus including a photosensitive drum or a photosensitive belt. However, the image forming apparatus according to the present invention can be configured as an inkjet image forming apparatus that includes a micro nozzle array capable of discharging ink droplets to directly print an image on a sheet, or can be a sublimation type or any other image forming apparatus.

<Configuration of Controller Unit Provided in Image Forming Apparatus>

Figure 2:
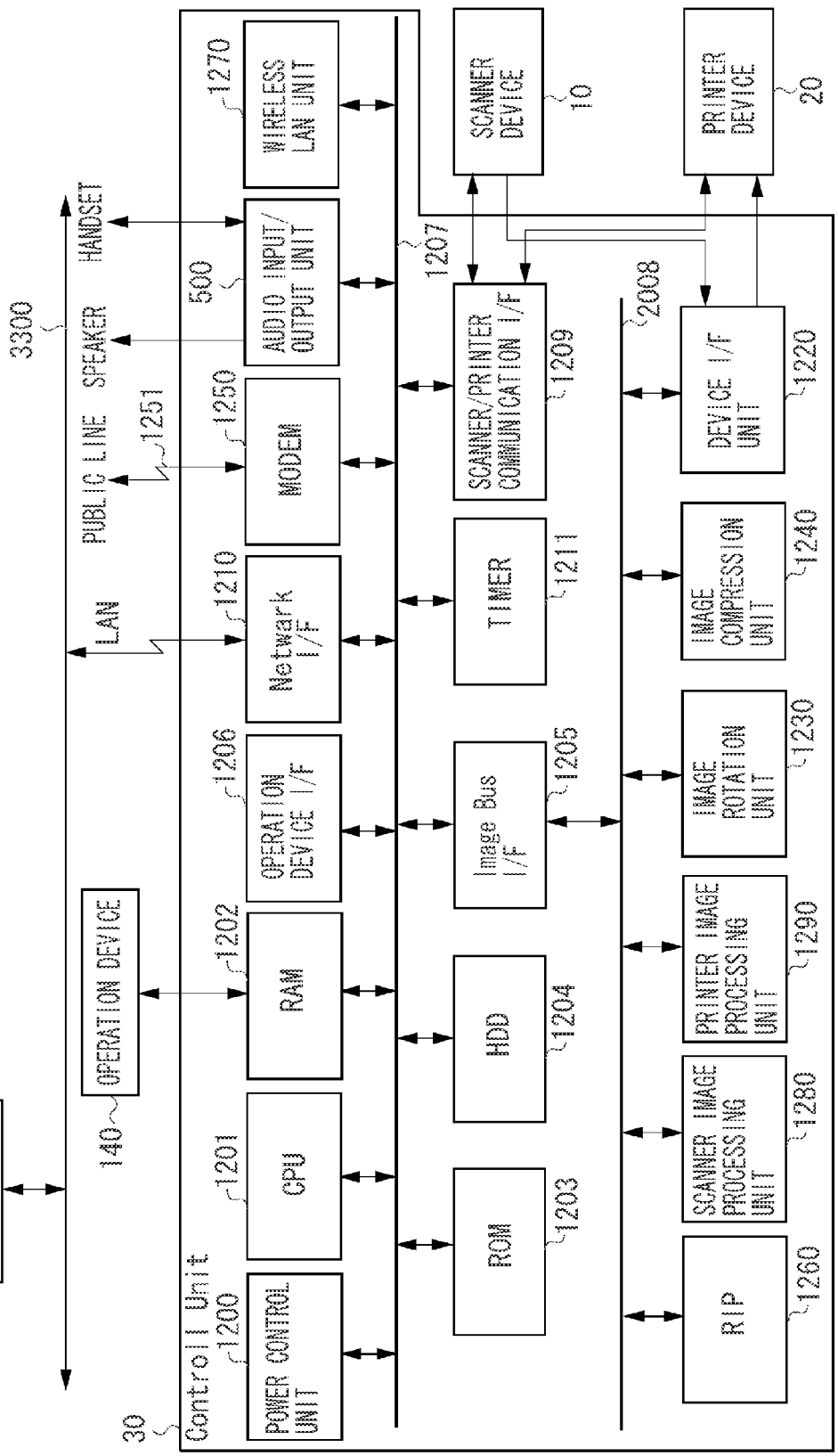
FIG. 2 illustrates a configuration of a controller unit according to an exemplary embodiment of the present invention.

FIG. 2 illustrates an example configuration of the controller unit 30. The controller unit 30 is connected to the scanner device 10 that can serve as an image reading device and the printer device 20 that can serve as an image output device. Further, the controller unit 30 includes a network unit 1210, a modem 1250, and a wireless LAN unit 1270. The network unit 1210 enables a central processing unit (CPU) 1201 provided in the controller unit 30 to communicate with a host computer 1100 or other external device (not illustrated) via a local area network (LAN) 3300.

A power control unit 1200 can control a power source of the image forming apparatus 100. The CPU 1201 is a controller that can control the entire system and execute various control programs. A random access memory (RAM) 1202 is operable as a system work memory when the CPU 1201 performs various operations and also operable as an image memory capable of temporarily storing image data. A read only memory (ROM) 1203 is a boot ROM that stores a system boot program.

The HDD 1204 stores system software, image data, and software counter value. The software counter value is, for example, a count value representing the number of sheets of read image or the number of sheets of output image. The storage portion of the counter value is not limited to the HDD 1204. For example, an Electrically Erasable Programmable Read Only Memory (EEPROM), or any other device capable of storing data even after the power source is turned off, can be used to store the counter value.

An operation device I/F 1206 is an interface unit that is provided between the controller unit 30 and an operation unit (UI) 140. The operation device I/F 1206 can output, to the operation device 140, image data to be displayed on the operation device 140. Further, when a user of the system inputs any information via the operation device 140, the operation device I/F 1206 sends the input information to the CPU 1201.

The network I/F 1210, if it is connected to the LAN 3300, can input and output various data relating to image output processing as well as device control information. Further, the network I/F 1210 can receive image data to be output from the host computer 1100 connected to the network or from an output image data management apparatus (not illustrated) according to an input operation performed on the operation device 140, to perform image output processing based on the received image data.

The modem 1250, if it is connected to the public line 1251, can input and output information. An audio input/output unit 500 can output sounds and voices via a speaker. Further, the audio input/output unit 500 can control a handset to perform an audio output operation or an audio input operation.

The wireless LAN 1270 is accessible to a wireless peripheral device, such as a digital camera (not illustrated) or a personal computer (PC), and can input and output various data relating to the image output processing as well as the device control information.

A scanner/printer communication I/F 1209 is an interface that enables the CPU 1201 of the controller unit 30 to communicate with a CPU of the scanner device 10 or a CPU of the printer device 20. A timer 1211 is functionally operable as a clock setting timer for the image forming apparatus 100 and the controller unit 30 or a trigger timer that generates interrupt signals at predetermined intervals. The above-described functional devices are connected via a system bus 1207.

An image bus I/F 1205 is a bus bridge that connects the system bus 1207 and an image bus 2008 capable of speedily transferring image data, and can convert a data structure of the transferred data. The image bus 2008 can be constituted by a PCI bus or IEEE1394. The following devices are connected to the image bus 1208.

A raster image processor (RIP) 1260 can perform rasterizing processing of a PDL code into a bitmap image. A scanner image processing unit 1280 can perform correction, modification, and editing processing on input image data. A printer image processing unit 1290 can perform printer correction and resolution conversion processing on print output image data.

An image rotation unit 1230 can rotate image data. An image compression unit 1240 can perform compression/decompression processing for converting multi-valued image data into JPEG data and converting binary image data into JBIG, MMR, or MH data. A device I/F unit 1220 connects the controller unit 30 to the scanner device 10 serving as an image input device or to the printer device 20 serving as an image output device. The device I/F unit 1220 can perform synchronous/asynchronous conversion processing on image data.

<Scanner Image Processing Unit>

Figure 3:
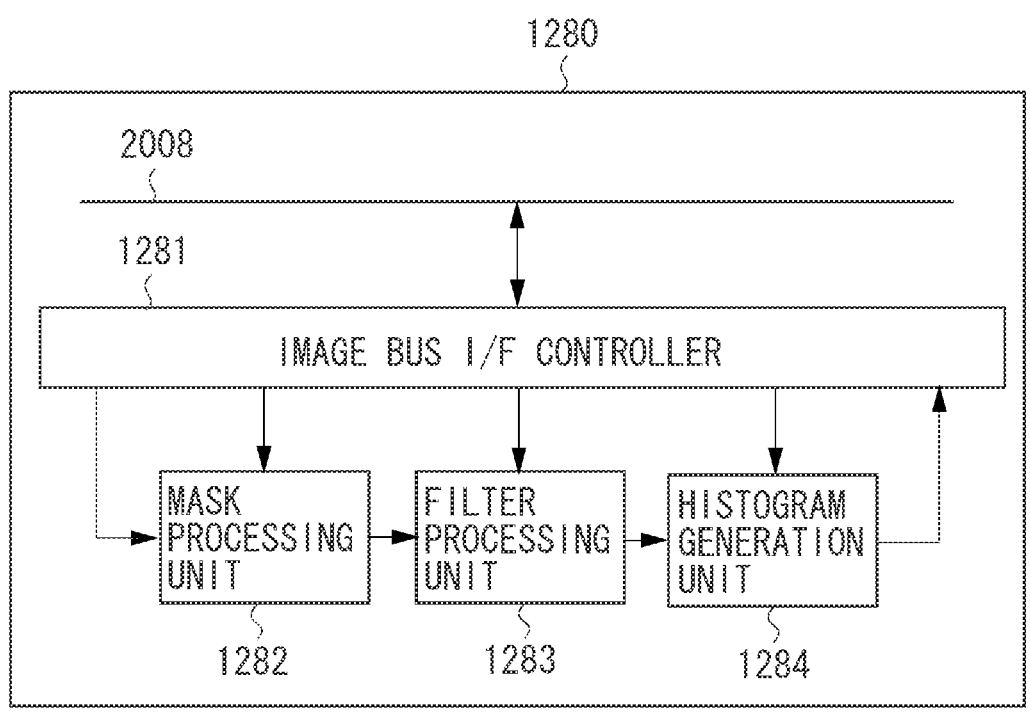
FIG. 3 is a block diagram illustrating a configuration of a scanner image processing unit according to an exemplary embodiment of the present invention.

FIG. 3 is a block diagram illustrating an example configuration of the scanner image processing unit 1280. The scanner image processing unit 1280 performs image data processing on a page-by-page basis.

The scanner image processing unit 1280 illustrated in FIG. 3 includes an image bus I/F controller 1281 that is connected to the image bus 2008. The image bus I/F controller 1281 controls a bus access sequence and generates control and timing signals for various devices provided in the scanner image processing unit 1280.

The scanner image processing unit 1280 further includes a mask processing unit 1282, a filter processing unit 1283, and a histogram generation unit 1284. The mask processing unit 1282 performs mask processing on input image data. The filter processing unit 1283 includes a spatial filter that performs convolution calculations. The histogram generation unit 1284 counts a cumulative luminance distribution of the input image data. The count value can be stored in a register that the CPU 1201 is accessible.

In blank paper detection processing, which is described below in detail, the CPU 1201 determines whether a read image is a blank paper image referring to the count value representing the cumulative luminance distribution of the input image data that was counted by the histogram generation unit 1284. In a case where the read document is a blank paper, a read luminance distribution deviates toward 255 representing "white" on the histogram. Therefore, the CPU 1201 performs the blank paper determination processing using the logic of identifying a blank paper image based on a tendency of the distribution.

For example, in the luminance distribution of input image data counted by the histogram generation unit 1284, if the ratio of count values corresponding to the luminance 250 and the above exceeds a threshold, the CPU 1201 determines that the input image data is a blank paper.

If the above-described processing performed on image data by the scanner image processing unit 1280 is completed, the processed image data is again transferred to the image bus via the image bus I/F controller 1281.

<Read Image Examples>

Figure 4:
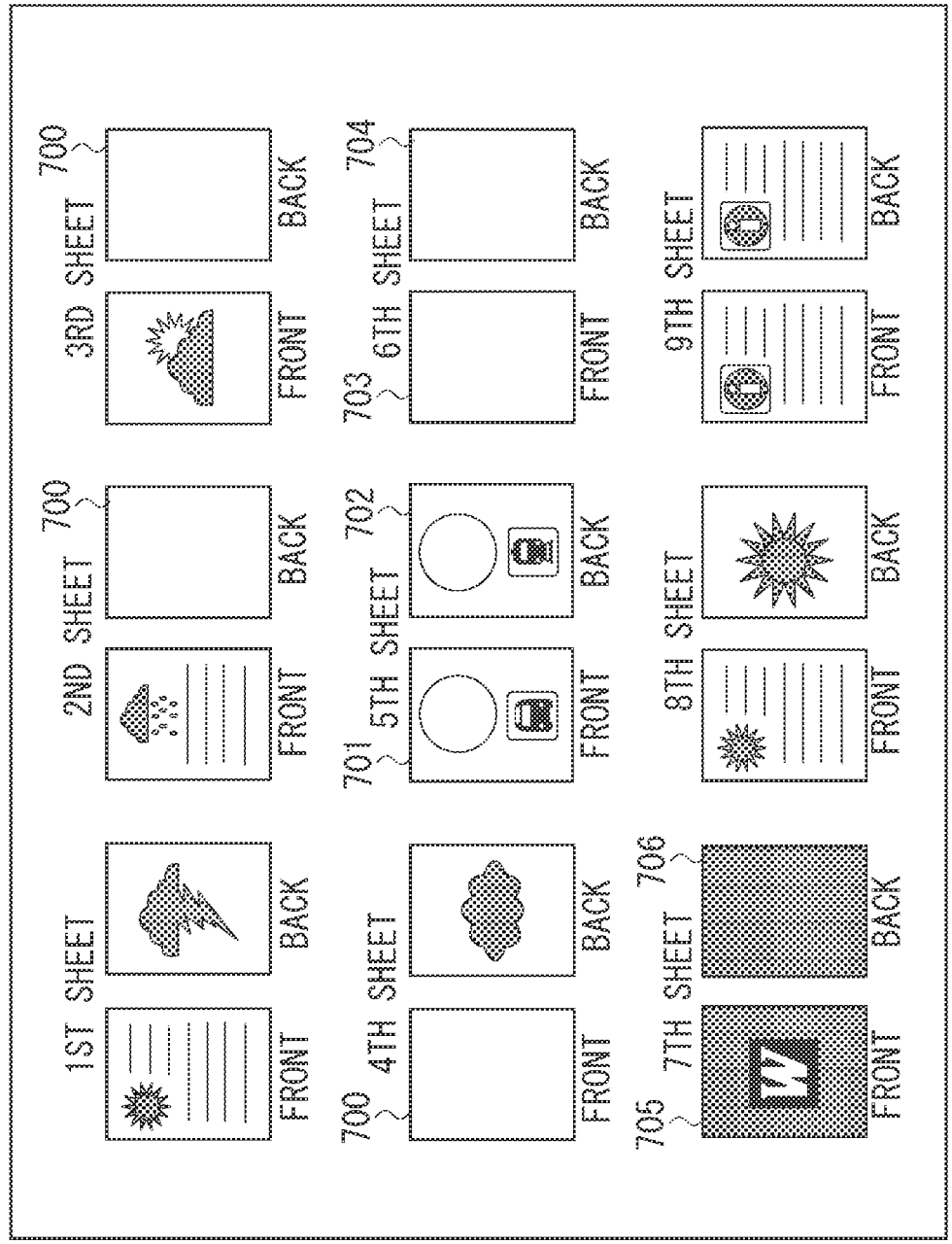
FIG. 4 illustrates examples of image data read by the image forming apparatus according to an exemplary embodiment of the present invention.

FIG. 4 illustrates examples of image data read by the image forming apparatus according to an exemplary embodiment of the present invention. The image data illustrated in FIG. 4 is a result of image reading processing performed on a two-sided document that includes a total of nine sheets (a total of 18 pages), which are sequentially arranged according to the page order.

The image data illustrated in FIG. 4 includes image data 700, 703, and 704 corresponding to blank pages included in the read document image. The document includes three sheets having a one-sided blank page (corresponding to page image 700) and one sheet having two-sided blank page (corresponding to page images 703 and 704).

Further, read image data 701 corresponds to a front surface of the second sheet and read image data 702 corresponds to a back surface of the second sheet. Namely, the image data 701 and the image data 702 are in a front and back relationship. For example, a postcard has a front surface on which an address and an addressee are written and a back surface on which a text body is written. In other words, the front and back surfaces of a postcard are in a mutually fixed relationship. Similarly, there are various types of documents formatted in a predetermined front and back relationship. More specifically, the front and back relationship defines a relationship between front and back surfaces of a document. Therefore, it is necessary to strictly reflect the front and back relationship in printing the image data of a document.

Further, read image data 705 and read image data 706 correspond to a colored sheet included in the read document.

<Blank Paper Deletion Result Obtained without Using Blank Paper Deletion Processing According to Present Invention (Conventional Blank Paper Deletion Result)>

Figure 5:
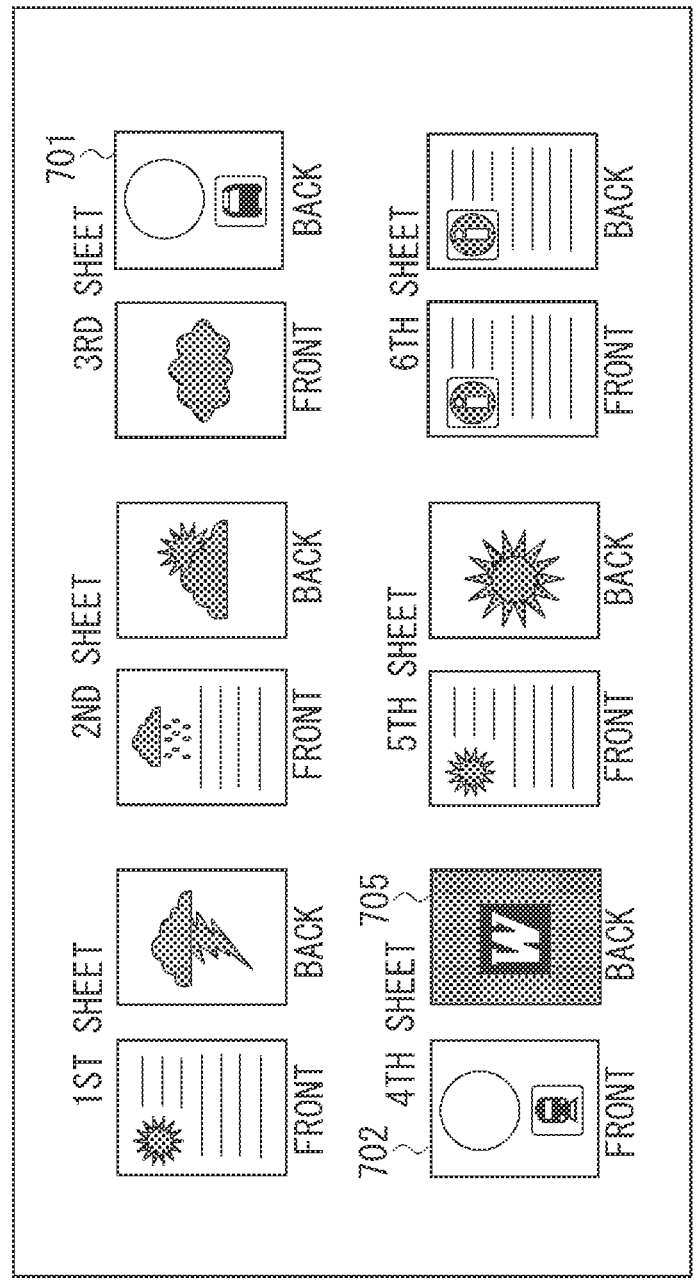
FIG. 5 illustrates an example of a two-sided printing layout obtainable when blank pages are deleted from a read image without using blank paper deletion processing according to an exemplary embodiment of the present invention.

FIG. 5 illustrates a two-sided printing layout obtainable when blank pages included in the read image are deleted without using the blank paper deletion processing according to the present invention.

According to the example illustrated in FIG. 5, all blank pages (700, 703, and 704) included in the read image data illustrated in FIG. 4 are completely deleted. According to the layout illustrated in FIG. 5, the front surface 701) of the fifth sheet included in the read image data illustrated in FIG. 4 is rearranged as a back surface of the third sheet. Further, the back surface 702 of the fifth sheet included in the read image data illustrated in FIG. 4 is rearranged as a front surface of the fourth sheet in FIG. 5.

As described above, if all blank pages are deleted, the arranging order of pages is forcibly changed. Therefore, image data of paired pages (i.e., front and back surfaces) obtained from the same document sheet may be separately rearranged on different sheets.

<Blank Paper Deletion Processing Result Obtained According to Present Invention>

Figure 6:
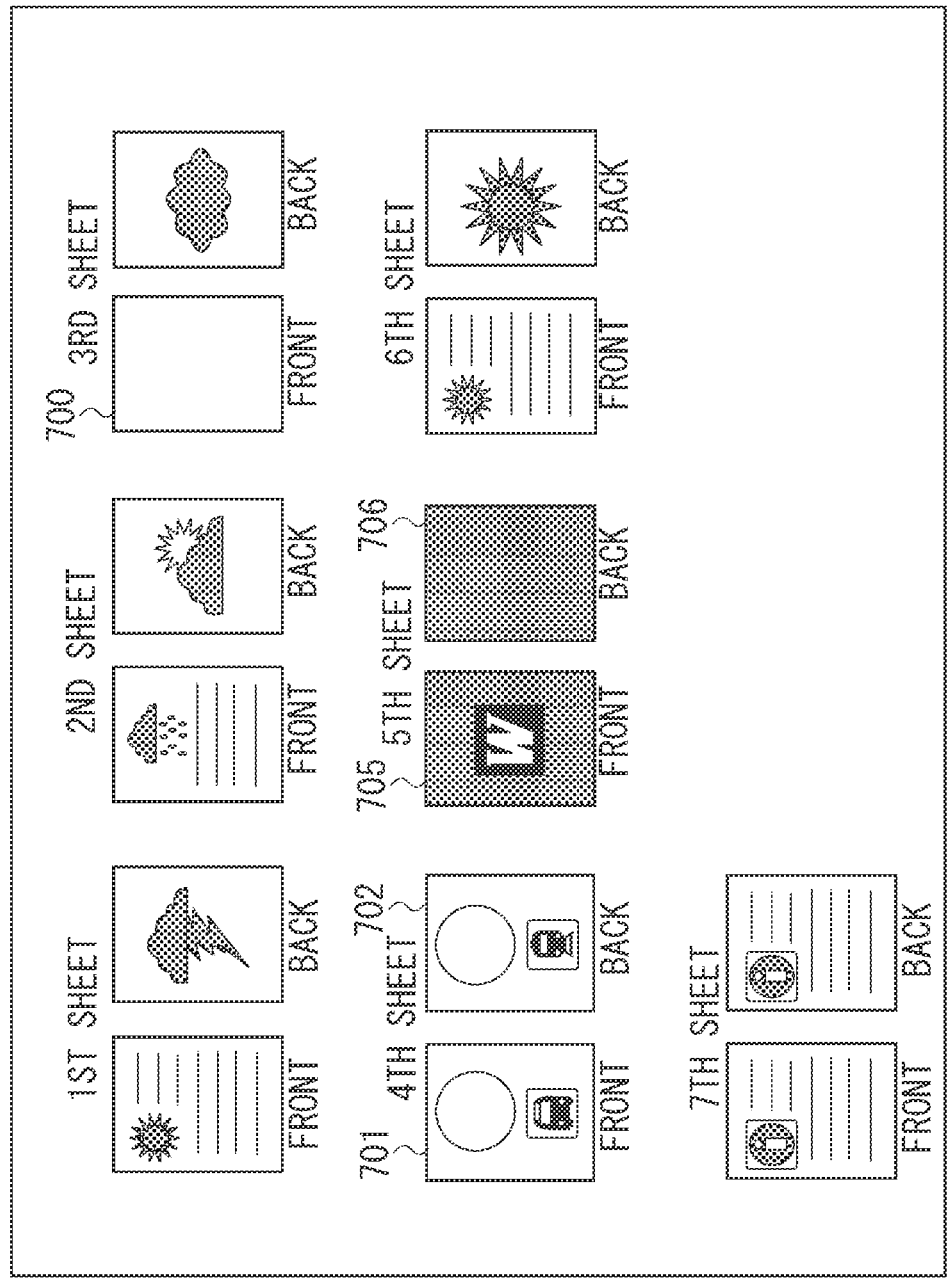
FIG. 6 illustrates an example of a two-sided printing layout obtained when blank pages included in the read image are deleted while fixing the relationship between consecutive pages by performing the blank paper deletion processing according to an exemplary embodiment of the present invention.

FIG. 6 illustrates a two-sided printing layout obtainable when blank pages included in the read image are deleted while fixing the relationship between consecutive pages by performing the blank paper deletion processing according to the present invention.

According to the layout illustrated in FIG. 6, the front surface 701 and the back surface 702 of the fifth sheet included in the image data illustrated in FIG. 4 are rearranged as a front surface and a back surface of the fourth sheet.

Figure 8:
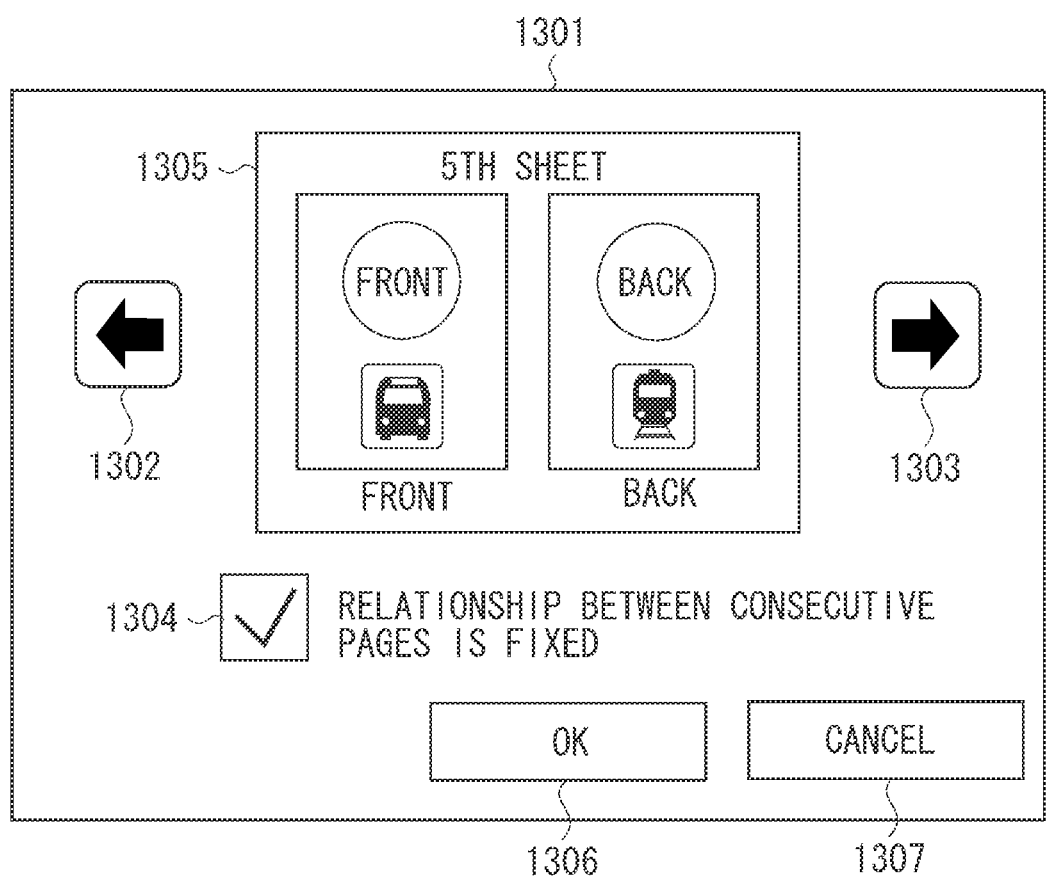
FIG. 8 illustrates an example of a consecutive page relationship fixing instruction screen that can be displayed on the liquid crystal operation panel of the operation device.

The layout illustrated in FIG. 6 can be obtained if a user instructs fixing the mutual relationship between the front surface 701 and the back surface 702 of the fifth sheet included in the input image data illustrated in FIG. 4, i.e., if the user designates the page images 701 and 702 as fixed pages, on a consecutive page relationship fixing instruction screen 1301 illustrated in FIG. 8. In this case, the blank paper deletion processing is performed to rearrange the page images in such a manner that one of three blank pages 700 is left without being deleted and newly arranged as a front surface of the third sheet.

Further, the image forming apparatus 100 can detect the front surface 705 and the back surface 706 of the seventh sheet included in the input image data illustrated in FIG. 4 as consecutive pages of a colored sheet whose relationship is to be fixed. Therefore, in the layout illustrated in FIG. 6, the page images 705 and 706 are rearranged as front and back surfaces of the fifth sheet. In this case, the page image 706 is excluded from the deletion objects, although the page image 706 does not include any image.

As described above, the image forming apparatus according to the present exemplary embodiment can fix the relationship between consecutive pages as pages 701 and 702 included in a read image. Further, the image forming apparatus according to the present exemplary embodiment can delete blank pages without changing the fixed relationship between the consecutive pages.

<Operation Unit>

The controller unit 30 can display a copy operation mode main screen on the liquid crystal operation panel of the operation device 140. The main screen includes an application mode key (not illustrated). If a user touches (presses) the application mode key, the controller unit 30 displays an application mode screen (not illustrated) on the liquid crystal operation panel of the operation device 140. The application mode screen includes a transition button. If a user touches (presses) the transition button, the controller unit 30 displays a blank paper deletion function mode designation screen (see FIG. 7) on the liquid crystal operation panel of the operation device 140.

Further, a screen similar to the screen displayed on the liquid crystal operation panel of the operation device 140 can be displayed on a display device of an external apparatus connected via a network, to enable a user of the external apparatus to perform a remote operation using an operation device and a display device of the above-described external apparatus.

<Blank Page Deletion Function Mode Designation Screen>

Figure 7:
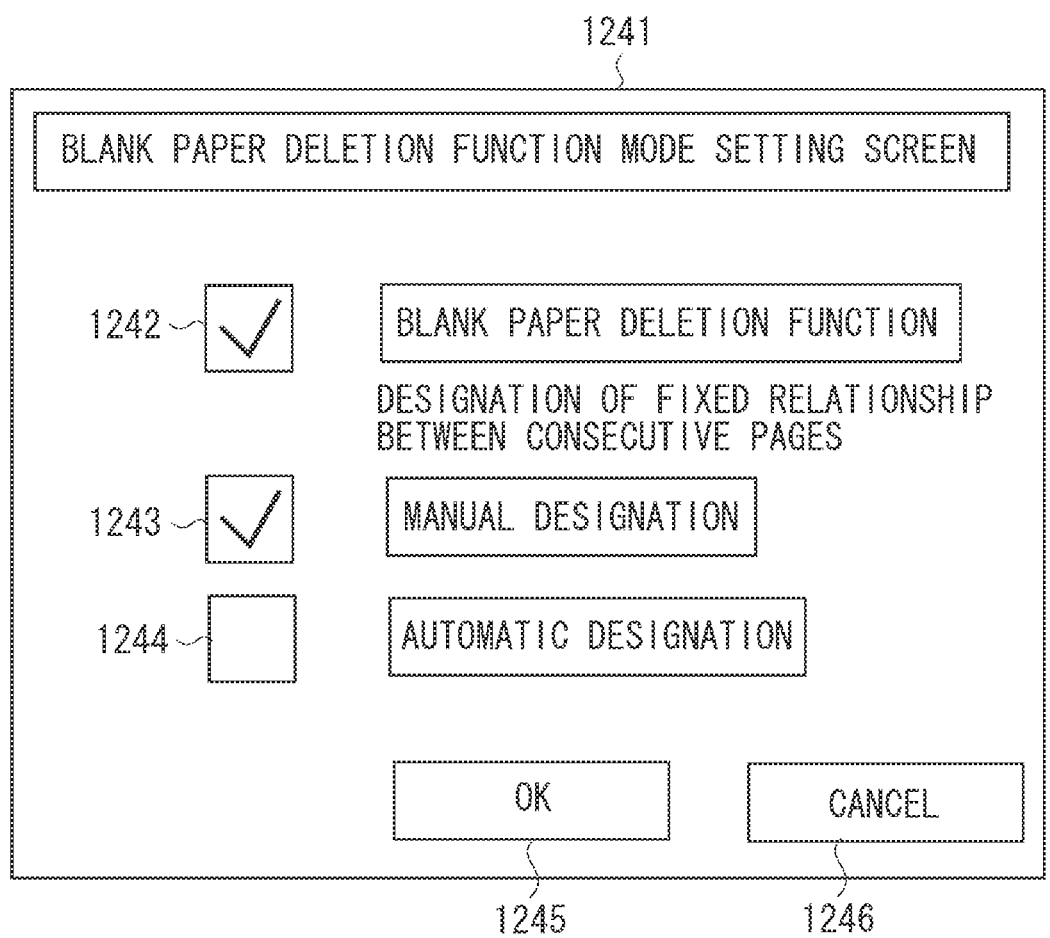
FIG. 7 illustrates an example of a blank paper deletion function mode setting screen displayed on a liquid crystal operation panel of an operation device.

FIG. 7 illustrates an example of a blank paper deletion function mode setting screen that can be displayed on the liquid crystal operation panel of the operation device 140.

A blank paper deletion function mode setting screen 1241 illustrated in FIG. 7 enables users to perform setting for deleting blank pages included in a read image. If the CPU 1201 of the controller unit 30 detects that the transition button is touched to display the blank paper deletion function mode designation screen of the above-described application mode screen, the CPU 1201 performs a control for displaying the blank paper deletion function mode setting screen 1241 on the liquid crystal operation panel of the operation device 140.

The blank paper deletion function mode setting screen 1241 includes check boxes 1242 to 1244, an OK button 1245, and a cancel button 1246. The check box 1242 is checkable to designate an ON/OFF state of the blank paper deletion function. If the check box 1242 is in a checked state, the CPU 1201 sets the blank paper deletion function to ON. If the check box 1242 is in a non-checked state, the CPU 1201 sets the blank paper deletion function to OFF.

The check box 1243 is checkable to select a designation method for manually fixing the relationship between consecutive pages of image data. If the check box 1243 is in a checked state, the CPU 1201 sets a page fixing designation method (i.e., the method for fixing the relationship between consecutive pages) to "manual designation."

The check box 1244 is checkable to select a designation method for automatically fixing the relationship between consecutive pages of image data. If the check box 1244 is in a checked state, the CPU 1201 sets the page fixing designation method to "automatic designation."

The CPU 1201 does not accept an operation for simultaneously checking both the check box 1243 and the check box 1244. Further, in a case where both the check box 1243 and the check box 1244 are both in the non-checked state, the CPU 1201 validates the setting that "the relationship between consecutive pages is not fixed." Further, in a case where either the check box 1243 or the check box 1244 is in the checked state, the CPU 1201 validates the setting that "the relationship between consecutive pages is fixed."

The OK button 1245 is operable to accept (or apply) the contents designated on the blank paper deletion function mode setting screen 1241. The designated contents can be stored in the HDD 1204. The cancel button 1246 is operable to cancel the contents presently designated on the blank paper deletion function mode setting screen 1241 to restore the previous setting contents.

<Consecutive Page Relationship Fixing Instruction Screen>

FIG. 8 illustrates an example of the consecutive page relationship fixing instruction screen that can be displayed on the liquid crystal operation panel of the operation device 140.

The consecutive page relationship fixing instruction screen 1301 illustrated in FIG. 8 enables users to instruct the relationship between consecutive pages of read image data. If the blank paper deletion function is set to ON and the above-described page fixing designation method (i.e., the method for fixing the relationship between consecutive pages) is set to "manual designation" as a result of settings illustrated in FIG. 7, the CPU 1201 of the controller unit 30 performs a control for displaying the consecutive page relationship fixing instruction screen 1301 on the liquid crystal operation panel of the operation device 140, after completing the document reading processing.

The consecutive page relationship fixing instruction screen 1301 includes a read image display field 1305 that can display images of a read document on a sheet-by-sheet basis. The CPU 1201 performs a control for displaying a front image and a back image, which can be obtained by reading the front and rear surfaces of a document sheet, on the consecutive page relationship fixing instruction screen 1301, so that the front image and the back image can reflect the mutual relationship between the front and back surfaces.

The consecutive page relationship fixing instruction screen 1301 includes a check box 1304 that is checkable to determine whether to fix the mutual relationship between the front and back surfaces of the image (two consecutive pages) to be displayed in the read image display field 1305.

Further, the consecutive page relationship fixing instruction screen 1301 includes two buttons 1302 and 1303. The button 1302 is operable to turn the pages of a document displayed in the read image display field 1305 in a forward direction on the sheet-by-sheet basis. The button 1303 is operable to turn the pages of a document displayed in the read image display field 1305 in a backward direction on the sheet-by-sheet basis.

If a user puts a check mark in the check box 1304 when selection of two consecutive pages is completed by touching (pressing) the buttons 1302 and 1303, the CPU 1201 fixes the mutual relationship between the selected consecutive pages (hereinafter, referred to as "fixed pages"). More specifically, if the check box 1304 is checked, the CPU 1201 designates two pages displayed in the read image display field 1305 as fixed pages.

The consecutive page relationship fixing instruction screen 1301 further includes an OK button 1306 and a cancel button 1307. The OK button 1306 is operable to accept (or apply) the contents designated on the consecutive page relationship fixing instruction screen 1301. The designated contents can be stored in the RAM 1202 or in the HDD 1204. The cancel button 1307 is operable to cancel the contents presently designated on the consecutive page relationship fixing instruction screen 1301 to restore the previous setting contents.

More specifically, the consecutive page relationship fixing instruction screen 1301 enables users to designate the relationship between the image data of consecutive pages to be fixed, among the image data of a plurality of pages input by the scanner device 10 and stored in the HDD 1204. The designate pages are set as fixed pages.

As described above, the consecutive page relationship fixing instruction screen 1301 is an example screen that is usable to instruct a fixed relationship between consecutive pages according to an exemplary embodiment of the present invention. Accordingly, the consecutive page relationship fixing instruction screen according to the present invention is not limited to the example screen illustrated in FIG. 8. Any other screen is usable if the screen can realize the operability for users to instruct a fixed relationship between consecutive pages included in read image data.

For example, it is useful to display a list of thumbnails representing all images read from a document stack so that the relationship of front and back surfaces constituting the document can be visually recognized and a user can easily instruct a fixed relationship between consecutive pages on the list.

<Blank Paper Detection Message Screen>

Figure 9:
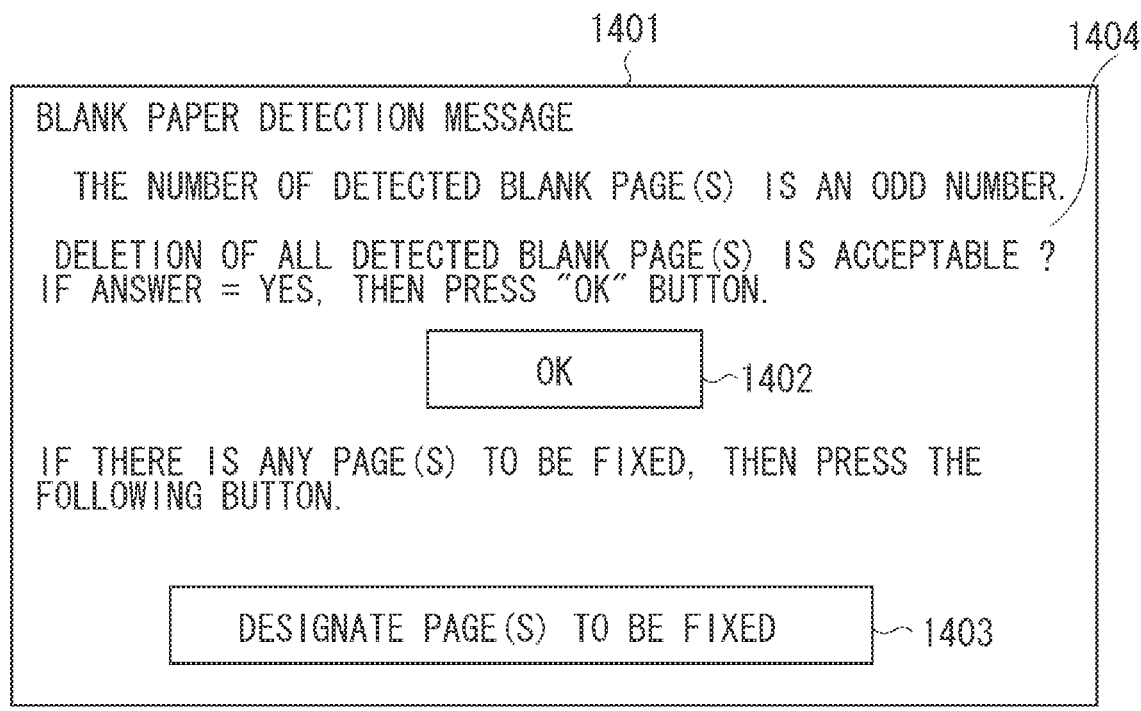
FIG. 9 illustrates an example of a blank paper detection message screen that is displayed on the liquid crystal operation panel of the operation device.

FIG. 9 illustrates an example of a blank paper detection message screen that can be displayed on the liquid crystal operation panel of the operation device 140.

A blank paper detection message screen 1401 illustrated in FIG. 9 is a screen that can be displayed by the image forming apparatus according to the present invention in a case where the number of blank page(s) detected among fixed page image data included in read image data is an odd number (i.e., NO in step S1413 illustrated in FIG. 10).

The blank paper detection message screen 1401 includes a message display field 1404, an OK button 1402, and a "designate page(s) to be fixed" button 1403. The message display field 1404 is usable to notify that the number of detected blank page(s) is an odd number. The OK button 1402 is operable to instruct deletion of the detected blank page(s) without changing any settings.

The "designate page(s) to be fixed" button 1403 is operable to instruct a fixed relationship between consecutive pages. If the "designate page(s) to be fixed" button 1403 is pressed, the setting contents designated on the consecutive page relationship fixing instruction screen 1301 illustrated in FIG. 8 can be confirmed and fixing of the mutual relationship between consecutive pages is instructed.

<Example Operation of Image Forming Apparatus According to First Exemplary Embodiment>

Figure 10A:
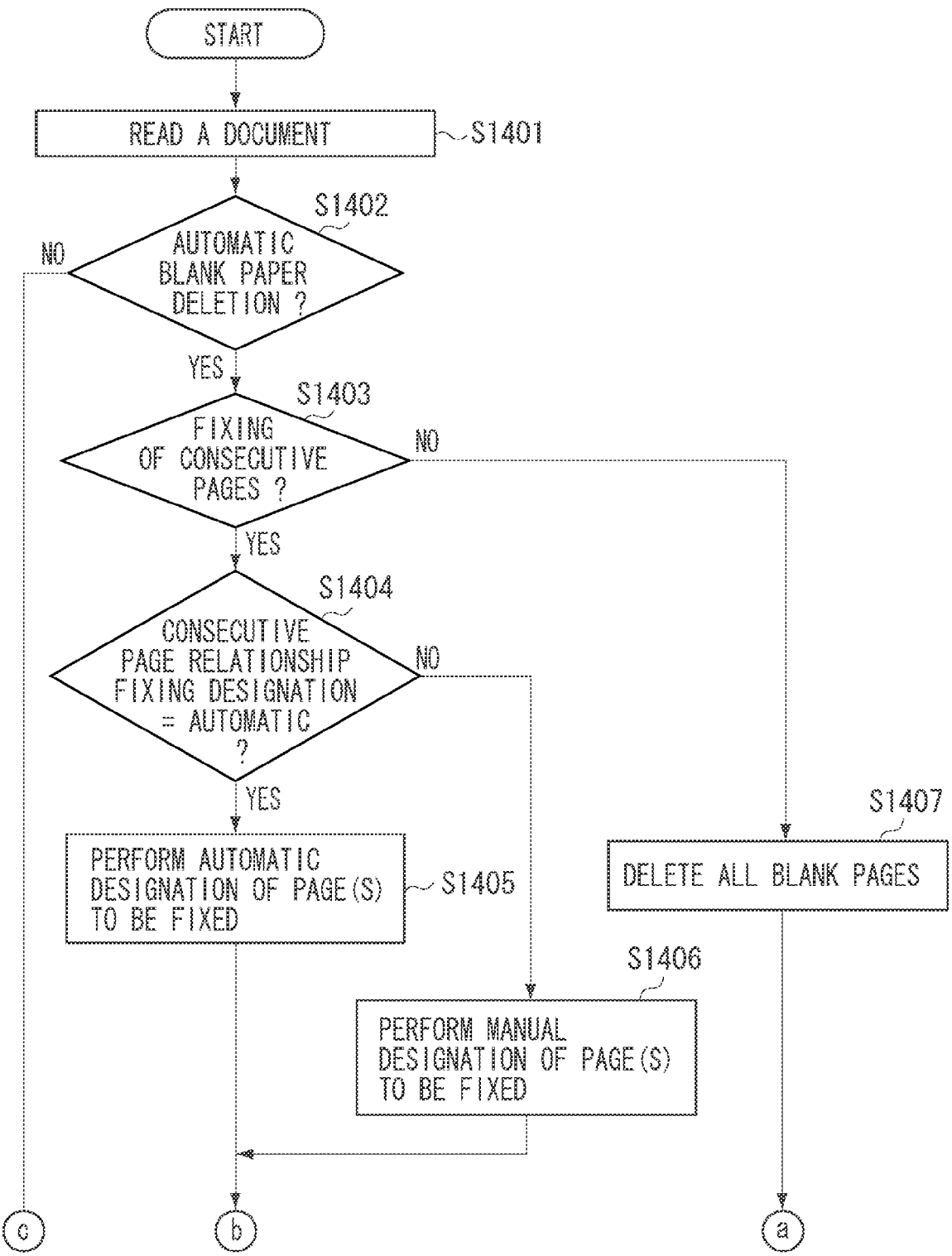
FIGS. 10A and 10B are flowcharts illustrating an example procedure of processing for deleting blank page(s) included in read image data, which can be performed by the image forming apparatus according to the first exemplary embodiment of the present invention.
Figure 10B:
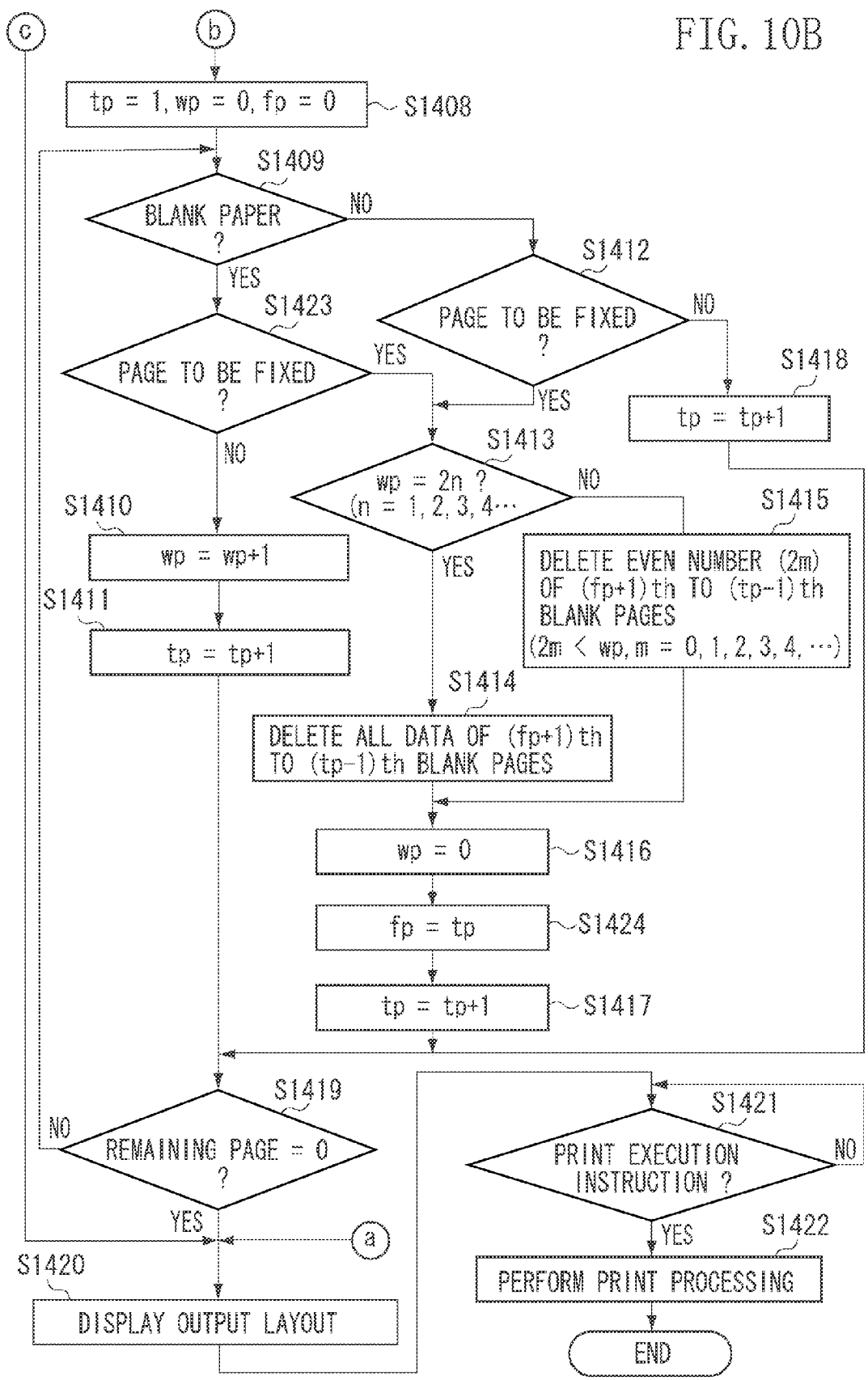

FIGS. 10A and 10B are flowcharts illustrating an example procedure of processing for deleting blank page(s) included in read image data, which can be performed by the image forming apparatus according to the first exemplary embodiment of the present invention. To realize the processing of the flowcharts illustrated in FIGS. 10A and 10B, the CPU 1201 of the controller unit 30 executes a control program loaded from the ROM 1203.

First, in the image forming apparatus 100, the CPU 1201 receives reading settings and a reading start instruction input via the operation device 140. Then, in step S1401, the CPU 1201 causes the scanner device 10 (i.e., the image reading device) to read a document (an original) based on the setting instruction. The CPU 1201 obtains image data of the read document (i.e., image data of a plurality of pages) and stores the obtained image data in the HDD 1204. The scanner device 10 can input image data corresponding to one page of a document (i.e., image data read from one surface of a document sheet) and can obtain image data of a plurality of pages.

The scanner device 10 inputs the image data read from a plurality of document sheets (i.e., image data of a plurality of pages) to the controller unit 30. The controller unit 30 stores the image data of the plurality of pages received from the scanner device 10 in the HDD 1204.

Next, in step S1402, the CPU 1201 determines whether an automatic blank paper deletion is designated (i.e., whether the check box 1242 illustrated in FIG. 7 is checked and the blank paper deletion function is set to ON). Then, in the above-described step S1402, if the CPU 1201 determines that the automatic blank paper deletion is not designated (NO in step S1402), the processing directly proceeds to step S1420.

On the other hand, in the above-described step S1402, if the CPU 1201 determines that the automatic blank paper deletion is designated (YES in step S1402), the processing proceeds to step S1403. In step S1403, the CPU 1201 determines whether the fixing of the relationship between consecutive pages included in the image data read from the document is set (i.e., whether either the check box 1243 or the check box 1244 illustrated in FIG. 7 is checked).

Then, in the above-described step S1403, if it is determined that the fixing of the relationship between consecutive pages included in the image data read from the document is not set (NO in step S1403), then in step S1407, the CPU 1201 deletes all blank pages included in the read image. The processing proceeds to step S1420.

On the other hand, in the above-described step S1403, if the CPU 1201 determines that the fixing of the relationship between consecutive pages included in the image data read from the document is set (YES in step S1403), the processing proceeds to step S1404.

In step S1404, the CPU 1201 determines whether the designation method for fixing the relationship between consecutive pages is set to "automatic designation." In the above-described step S1404, if it is determined that the designation method for fixing the relationship between consecutive pages is set to "automatic designation" (YES in step S1404), then in step S1405, the CPU 1201 automatically detects the relationship of consecutive pages to perform fixing designation. The processing proceeds to step S1408.

The automatic fixed page designation processing to be performed in the above-described step S1405 is described below in more detail. Further, the automatically designated fixed page setting information is stored in the RAM 1202 or in the HDD 1204.

On the other hand, in the above-described step S1404, if the CPU 1201 determines that the designation method for fixing the relationship between consecutive pages is set to "manual designation" (NO in step S1404), the processing proceeds to step S1406.

In step S1406, the CPU 1201 displays the consecutive page relationship fixing instruction screen 1301 (see FIG. 8) on the liquid crystal operation panel of the operation device 140 and accepts designations manually input by a user. Then, if the CPU 1201 determines that the input of manual designations by the user is completed (i.e., if the OK button 1306 is touched (pressed)), the processing proceeds to step S1408. In this case, the manually designated fixed page setting information is stored in the RAM 1202 or in the HDD 1204.

In step S1408, the CPU 1201 initializes a page counter value tp, a blank page counter value wp, and a fixed page number fp to respective initial values (tp=1, wp=0, and fp=0).

The page counter value tp indicates the number of pages counted from the head page. The blank page counter value wp indicates the number of blank pages. The fixed page number fp indicates the page number of the final fixed page that is before the page indicated by the page counter value tp.

Next, in step S1409, the CPU 1201 determines whether the page indicated by the page counter value tp is a blank page. Then, in the above-described step S1409, if the CPU 1201 determines that the page indicated by the page counter value tp is the blank page (YES in step S1409), the processing proceeds to step S1423.

In step S1423, the CPU 1201 determines whether the page indicated by the page counter value tp is a fixed page (i.e., a page designated to fix a mutual relationship with an adjacent page).

Then, in the above-described step S1423, if the CPU 1201 determines that the page indicated by the page counter value tp is not a fixed page (NO in step S1423), the processing proceeds to step S1410.

In step S1410, the CPU 1201 increments the blank page counter value wp (i.e., wp=wp+1). Next, in step S1411, the CPU 1201 increments the page counter value tp (i.e., tp=tp+1). Then, the processing proceeds to step S1419.

On the other hand, in the above-described step S1423, if the CPU 1201 determines that the page indicated by the page counter value tp is a fixed page (YES in step S1423), the processing proceeds to step S1413.

Further, in the above-described S1409, if the CPU 1201 determines that the page indicated by the page counter value tp is not the blank page (NO in step S1409), the processing proceeds to step S1412.

In step S1412, the CPU 1201 determines whether the page indicated by the page counter value tp is a fixed page. Then, in the above-described step S1412, if it is determined that the page indicated by the page counter value tp is not a fixed page (NO in step S1412), then in step S1418, the CPU 1201 increments the page counter value tp (i.e., tp=tp+1). The processing proceeds to step S1419.

On the other hand, in the above-described step S1412, if the CPU 1201 determines that the page indicated by the page counter value tp is a fixed page (YES in step S1412), the processing proceeds to step S1413.

In step S1413, the CPU 1201 determines whether the blank page counter value wp is a multiple of 2 (wp=2n), wherein n=1, 2, 3, 4, . . . .

Then, if it is determined that the blank page counter value wp is the multiple of 2 (YES in step S1413), then in step S1414, the CPU 1201 deletes all blank pages included in the image data of (fp+1)th to (tp−1)th pages. Then, the processing proceeds to step S1416.

On the other hand, if it is determined that the blank page counter value wp is not the multiple of 2, i.e., when the blank page counter value wp is an odd number (NO in step S1413), the processing proceeds to step S1415.

In step S1415, the CPU 1201 displays the blank page detection message screen 1401 illustrated in FIG. 9 on the liquid crystal operation panel of the operation device 140 to accept an input from a user.

Then, if the OK button 1402 is touched (pressed), then in step S1415, the CPU 1201 deletes an even number (2m) of blank pages included in the image data of (fp+1)th to (tp−1)th pages, in which the even number (2m) is less than the total number of blank pages (i.e., the blank page counter value wp), wherein m=1, 2, 3, 4, . . . . For example, the CPU 1201 deletes a blank page indicated by the blank page counter value wp−1.

If the button 1403 is touched (pressed), the CPU 1201 displays the consecutive page relationship fixing instruction screen 1301 (see FIG. 8) on the liquid crystal operation panel of the operation device 140 to accept a manual setting input by a user. Then, if the manual designation by the user is completed, the CPU 1201 excludes blank pages newly designated as fixed pages through the above-described designation processing from the blank pages designated as deletion candidates, and subtracts the number of excluded pages from the blank page counter value wp.

Further, in a case where there is any blank page(s) removed from the fixed page designation through the above-described designation, the CPU 1201 adds the removed blank page(s) to the blank pages designated as deletion candidates and adds the number of added pages to the blank page counter value wp. Then, the CPU 1201 deletes an even number (2m) of blank pages included in the image data of (fp+1)th to (tp−1)th pages, in which the even number (2m) is less than the total number of blank pages (i.e., the blank page counter value wp), wherein m=1, 2, 3, 4, . . . . Then, the processing proceeds to step S1416.

In step S1416, the CPU 1201 initializes the blank page counter value wp (i.e., wp=0). Next, in step S1424, the CPU 1201 inputs the page counter value tp into the fixed page number fp (i.e., fp=tp). Next, in step S1417, the CPU 1201 increments the page counter value tp (i.e., tp=tp+1). Then, the processing proceeds to step S1419.

In step S1419, the CPU 1201 determines whether there is any remaining page. If it is determined that a remaining page is present (NO in step S1419), the processing returns to step S1409 and performs the above-described processing for the next page.

On the other hand, in the above-described step S1419, it is determined that there is no remaining page (YES in step S1419), then in step S1420, the CPU 1201 performs a control for displaying an output layout on the liquid crystal operation panel of the operation device 140.

Next, in step S1421, the CPU 1201 accepts a print execution instruction input via the operation device 140. If the print execution instruction is input (YES in step S1421), then in step S1422, the CPU 1201 reads layout completed image data from the HDD 1204 and transmits the read image data to the printer device 20 to perform printing. Then, the CPU 1201 terminates the processing of the flowchart illustrated in FIG. 10.

In the above-described step S1422, the CPU 1201 can transmit the read layout completed image data to another apparatus (e.g., a personal computer, a facsimile machine, or any other image forming apparatus) or store the layout completed image data in an appropriate storage device.

The above-described operational flow is an example operation that can be performed by the image forming apparatus according to the first exemplary embodiment of the present invention.

Accordingly, the operational flow according to the present invention is not limited to the above-described operational flow and can be any other flow that includes at least the following steps (1) to (5).

(1) A step of designating, as fixed pages, image data of consecutive pages whose relationship is to be fixed among a read image;

(2) a step of counting the number of blank page(s) existing between the fixed pages;

(3) a step of determining whether a count result of the above-described step (2) is an even number;

(4) a step of deleting all blank pages existing between the fixed pages in a case where the determination result in the above-described step (3) is an even number; and (5) a step of deleting an even number of blank pages existing between the fixed pages in a case where the determination result in the above-described step (3) is an odd number (for example, a step of leaving only one blank page, more specifically, a step of deleting blank pages corresponding to a maximum even number, which is less than the number of blank pages existing between the fixed pages). It is useful to further provide a step of re-designating fixed pages in a case where the determination result in the above-described step (3) is not an odd number.

The automatic fixed page designation processing to be performed in step S1405 of FIG. 10 is described below in more detail.

<Automatic Fixed Page Designation Processing to be Performed in Step S1405 of FIG. 10>

In the automatic fixed page designation processing (see step S1405 in FIG. 10), the CPU 1201 processes all pages of a read image using an already known technique (e.g., OCR technique or information (e.g., bar code) embedding technique).

Further, the CPU 1201 identifies attributes of a read image and a document sheet type (e.g., front surface or back surface) based on the processing result, and detects image data corresponding to consecutive pages whose relationship is to be fixed among the read image data. Further, the CPU 1201 designates the above-described detected consecutive pages whose relationship is to be fixed as fixed pages.

For example, if it is determined that the document sheet type of consecutive pages is a same special sheet (e.g., colored sheet or high-quality sheet), the CPU 1201 determines that the consecutive pages whose relationship is to be fixed have been detected and designates the detected pages as fixed pages.

In this case, the CPU 1201 can recognize a document type based on information extracted from document image data (e.g., character strings and places of the character strings), which can be obtained using the OCR technique, and detects consecutive pages whose relationship is to be fixed. More specifically, the CPU 1201 recognizes a document based on image data and further analyzes character strings (e.g., document title/format layout/page number) and their layout positions.

Further, based on the above-described analysis result, if it is detected that the title character strings and the format layout of consecutive pages are the same, or page numbers of the consecutive pages are continuous, or any characters clearly indicating the relationship between pages, such as "front" and "rear", are included in a document image, the CPU 1201 determines that consecutive pages whose relationship is to be fixed have been detected.

Further, if the document detected through the above-described analysis is a postcard, the CPU 1201 determines that consecutive pages whose relationship is to be fixed have been detected.

Further, the CPU 1201 can determine the detection of consecutive pages whose relationship is to be fixed based on a bar code included in a document image. For example, as an example method using the bar code, it is useful to embed a bar code in each of consecutive pages whose relationship is to be fixed or record a bar code representing document type information on a sheet, so that the CPU 1201 can identify the mutual relationship between the consecutive pages based on the detected document type.

For example, it is useful to record a bar code indicating a pre-defined document type, such as a document having front and back surfaces that are paired or a one-sided document, on a sheet so that the CPU 1201 can identify the relationship between a read surface and the following surface based on the information of the bar code.

In the automatic fixed page designation processing (step S1405 illustrated in FIG. 10), based on the above-described read image detection result, the CPU 1201 automatically detects the relationship between consecutive pages and designates pages whose relationship is to be fixed.

The objects that can be designated as consecutive pages whose relationship is to be fixed is not limited to only the images read by a scanner, regardless of the automatic designation or the manual designation. For example, the objects whose relationship is to be fixed can include any other images transmitted from a personal computer (PC) or a facsimile machine or any other image data stored beforehand in the HDD 1204 of the apparatus.

Further, in the above-described present exemplary embodiment, a user is allowed to select an automatic setting or a manual setting. In this case, if the manual setting is designated, the CPU 1201 can preliminarily perform automatic setting and then allow the user to manually change an automatic setting result.

As described above, according to the present exemplary embodiment, users can delete unnecessary blank page(s) without changing a desired output layout (e.g., a desired relationship between a front page and a back page). More specifically, users can obtain a desired printed output of consecutive pages whose relationship is adequately maintained, while efficiently reducing the total number of printed output sheets. As described above, the above-described exemplary embodiment can improve the usability of an image processing apparatus so that users can obtain desired output results while considering effective use of resources.

<Flowchart of Processing Performed by Image Forming Apparatus According to Second Exemplary Embodiment>

The image forming apparatus according to a second exemplary embodiment performs an N-in-1 reduced layout printing operation (i.e., a printing operation for realizing a reduced layout of image data of a designated number of pages (N pages) arranged on one surface of a print sheet).

In the second exemplary embodiment, to perform the N-in-1 reduced layout printing operation, the image forming apparatus 100 generates an output layout that fixes a positional relationship between image data of consecutive pages that are designated as fixed pages.

An example operation for deleting blank page(s) included in read image data, which can be performed by the image forming apparatus according to the second exemplary embodiment, is described below with reference to a flowchart illustrated in FIG. 11.

Figure 11A:
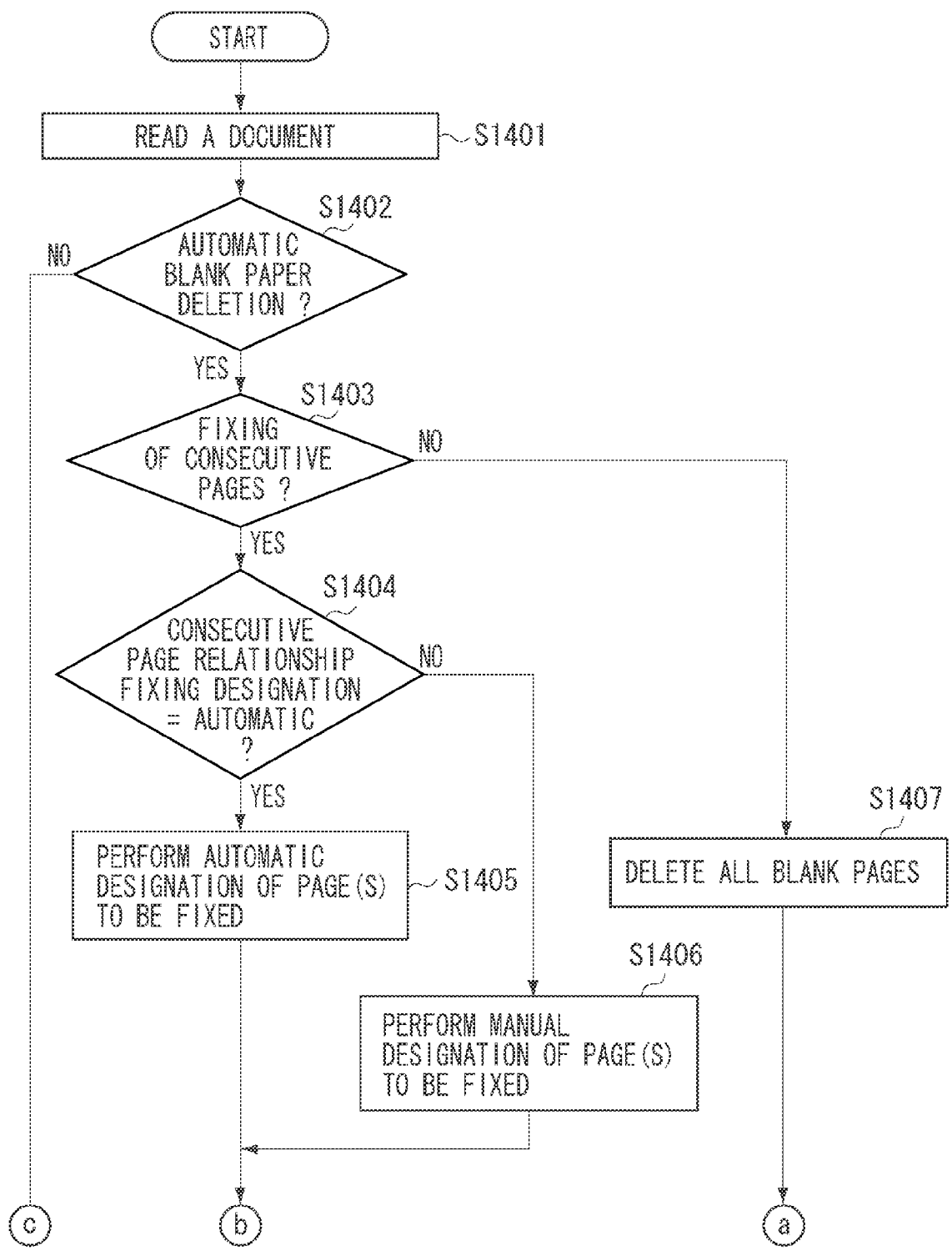
FIGS. 11A and 11B are flowcharts illustrating an example procedure of processing for deleting blank page(s) included in read image data, which can be performed by the image forming apparatus according to a second exemplary embodiment.
Figure 11B:
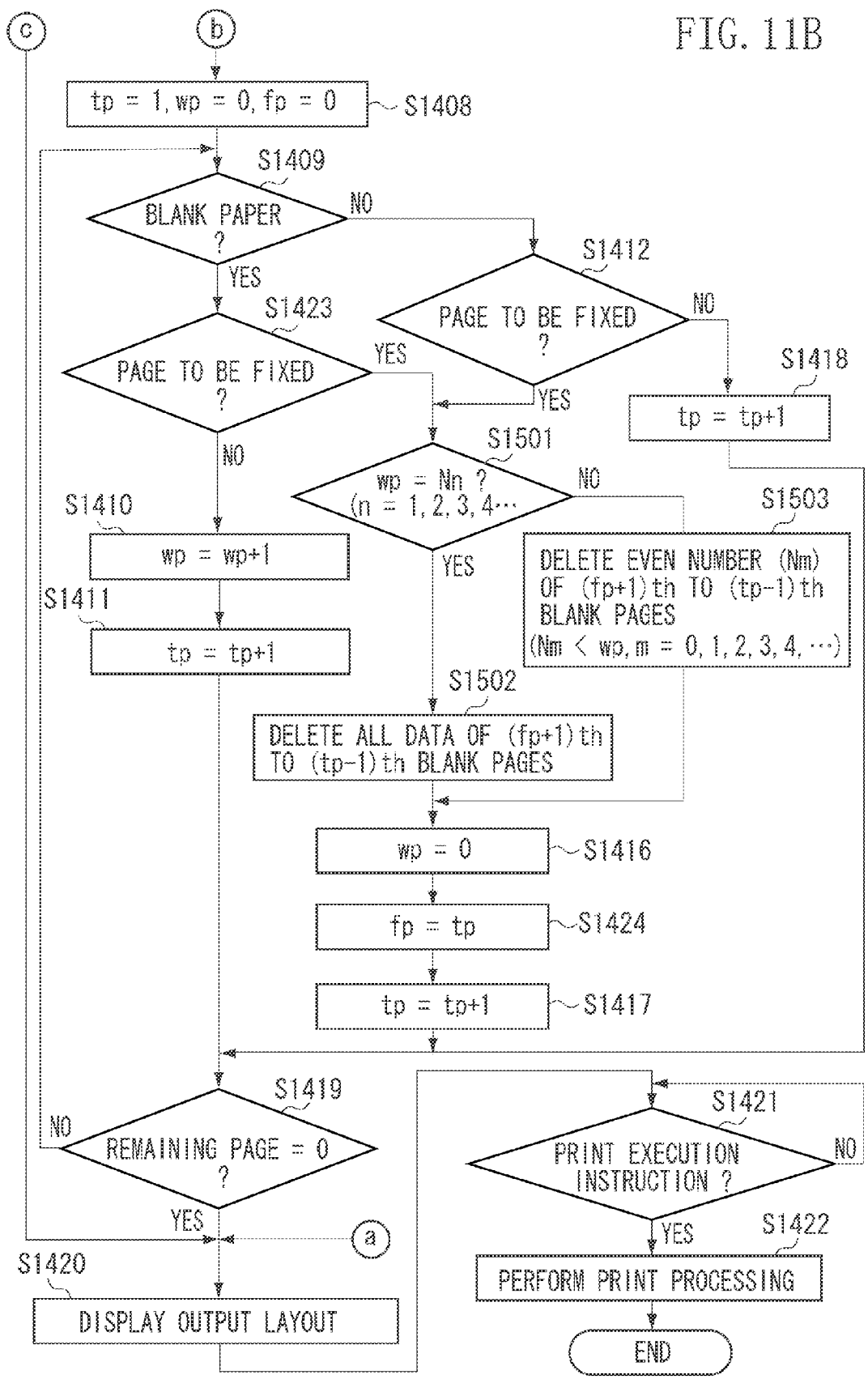

FIGS. 11A and 11B are flowcharts illustrating an example procedure of processing for deleting blank page(s) included in read image data that can be performed by the image forming apparatus according to the second exemplary embodiment. To realize the processing of the flowcharts illustrated in FIGS. 11A and 11B, the CPU 1201 of the controller unit 30 executes a control program loaded from the ROM 1203.

The flowcharts illustrated in FIGS. 11A and 11B are examples of an operational flow that is applicable in a case where the selected printing layout is the N-in-1 reduced layout. Further, the flowchart illustrated in FIG. 11 (11A and 11B) is basically similar to the flowchart illustrated in FIG. 10 and therefore similar steps are denoted by the same step numbers.

The flowchart illustrated in FIG. 11 is different from the flowchart illustrated in FIG. 10 in that steps S1413 to S1415 are replaced by steps S1501 to S1503, as described below.

If the CPU 1201 determines that the page indicated by the page counter value tp is a fixed page (YES in step S1423), the processing proceeds to step S1501. Further, if the CPU 1201 determines that the page indicated by the page counter value tp is a fixed page (YES in step S1412), the processing proceeds to step S1501.

In step S1501, the CPU 1201 determines whether the blank page counter value wp is a multiple of N (wp=Nn) that relates to the N-in-1 reduced layout, wherein n=1, 2, 3, 4, . . . .

Then, if it is determined that the blank page counter value wp is a multiple of N (YES in step S1501), then in step S1502, the CPU 1201 deletes all blank pages included in the image data of (fp+1)th to (tp−1)th pages. The processing proceeds to step S1416.

On the other hand, if it is determined that the blank page counter value wp is not a multiple of N (NO in step S1501), the processing proceeds to step S1503. In step S1503, the CPU 1201 displays the blank paper detection message screen 1401 illustrated in FIG. 9 on the liquid crystal operation panel of the operation device 140 to accept an input from a user.

In the second exemplary embodiment, the CPU 1201 displays a message "the number of detected blank pages is not a multiple of N relating to the N-in-1 reduced layout" in the message display filed 1404, instead of displaying a message "the number of detected blank pages is not a multiple of 2."

Then, if the OK button 1402 is touched (pressed), then in step S1503, the CPU 1201 deletes a total of Nm blank pages from the image data included in the (fp+1)th to (tp−1)th pages, in which Nm is a multiple of N less than the total number of blank pages (i.e., the blank page counter value wp), wherein m=1, 2, 3, 4, . . . . For example, the CPU 1201 deletes Nm blank pages, in which Nm is a maximum value not exceeding the blank page counter value wp.

If the button 1403 is touched (pressed), the CPU 1201 displays the consecutive page relationship fixing instruction screen 1301 (see FIG. 8) on the liquid crystal operation panel of the operation device 140 to accept a manual designation input by a user. Then, if the manual designation by the user is completed, the CPU 1201 excludes blank pages newly set as fixed pages through the above-described setting processing from the blank pages designated as deletion candidates, and subtracts the number of excluded pages from the blank page counter value wp.

Further, in a case where there is any blank page(s) removed from the fixed page setting through the above-described designation, the CPU 1201 adds the removed blank page(s) to the blank pages designated as deletion candidates and adds the number of added pages to the blank page counter value wp. Then, the CPU 1201 deletes a total of Nm blank pages included in the image data of (fp+1)th to (tp−1)th pages, in which Nm is less than the total number of blank pages (i.e., the blank page counter value wp), wherein m=1, 2, 3, 4, . . . . Then, the processing proceeds to step S1416. Subsequently, the CPU 1201 performs processing similar to that illustrated in FIG. 10.

The above-described operational flow is an example operation that can be performed by the image forming apparatus according to the second exemplary embodiment of the present invention.

Accordingly, the operational flow according to the present invention is not limited to the above-described operational flow and can be any other flow that includes at least the following steps (5) to (8).

(5) A step of designating fixed pages (i.e., consecutive pages whose relationship is to be fixed) in a read image;
(6) a step of counting blank pages existing between fixed pages;
(7) a step of determining whether the count result in the above-described step (6) is equal to a multiple of N;
(8) a step of deleting all blank pages existing between the fixed pages in a case where the determination result in the above-described step (7) is a multiple of N; and
(9) a step of deleting blank pages corresponding to a multiple of N between the fixed pages in a case where the determination result in the above-described step (7) is not a multiple of N (for example, a step of leaving blank pages corresponding to the remainder obtained when the number of the blank pages existing between fixed pages is divided by N, more specifically, a step of deleting blank pages corresponding to a maximum multiple of N, which is less than the number of blank pages existing between the fixed pages). It is useful to further provide a step of re-designating fixed pages in a case where the determination result in the above-described step (2) is not a multiple of N.

As described above, the logic of comparing and determining the number of blank pages and the logic of determining the number of pages to be deleted are dependent on an actual output layout. Therefore, the present invention is not limited to the above-described exemplary embodiment. More specifically, the present invention can be applied to any other configuration that can delete blank pages corresponding to a multiple of a number relating to an output layout number among the fixed pages.

As described above, according to the present exemplary embodiment, even in a case where the N-in-1 reduced layout printing operation is performed, users can delete unnecessary blank page(s) without changing a desired output layout (e.g., a desired relationship between a front page and a back page).

In the above-described exemplary embodiments, the objects that can be processed by the image forming apparatus 100 are image data read by a scanner device. However, the processing objects are not limited to the image data read by the scanner device. For example, image data transmitted from any other apparatus (e.g., a personal computer or a facsimile) and image data stored beforehand in the HDD 1204 of the apparatus or in any other recording medium (e.g., a flash memory) are examples of the objects that can be processed by the image forming apparatus 100.

Further, according to the above-described exemplary embodiments, the output designation of layout completed image data is a printer. However, according to another exemplary embodiment of the present invention, an output layout result may be transmitted to an external device.

The configurations according to the above-described exemplary embodiments enable users to designate a fixed relationship between consecutive pages (e.g., front and back surfaces of a sheet). However, the relationship between consecutive pages can be the relationship between right and left pages or between upper and lower pages positioned on a sheet in an opened state.

In this case, in automatic fixed page setting processing, the CPU 1201 identifies lines, shapes, and colors constituting images of consecutive pages and, if it is determined that the images in the consecutive pages forms a single image (e.g., illustration, picture, and forms), sets these pages as fixed pages.

Further, if any specific characters clearly indicating the positional relationship between adjacent pages, such as "right", "left", "upper", and "lower", are detected in a document image, the CPU 1201 can determine that the relationship between consecutive pages has been detected. Further, the CPU 1201 can detect and determine the relationship between consecutive pages based on a bar code included in a document image.

For example, it is useful to embed a bar code on consecutive pages in an opened state so that the CPU 1201 can analyze the bar code to identify the mutual relationship between the consecutive pages.

Further, it is useful to enable users to set a designation for fixing the relationship between consecutive pages (which are front and back surfaces) as a first fixed page designation or set a designation for fixing the relationship between consecutive pages (which are in an opened state) as a second fixed page designation.

According to the above-described configuration, the image forming apparatus performs the operation described in the first exemplary embodiment if the first fixed page designation is selected, and performs the operation described in the second exemplary embodiment if the second fixed page designation is selected. Further, it is useful to enable users to simultaneously designate the first fixed page designation and the second fixed page designation.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-224279 filed Sep. 29, 2009, which is hereby incorporated by reference herein in its entirety.

What is claimed is:

1. An image processing apparatus, comprising:
an input unit configured to input image data of a plurality of pages;
a setting unit configured to set fixed page image data, as image data of a plurality of consecutive pages whose relationship is to be fixed, among the image data input by the input unit;
a calculation unit configured to calculate a number of pages of image data corresponding to blank pages that are present between the fixed page image data; and
a control unit configured to prevent image data corresponding to all blank pages existing between the fixed page image data from being printed when the number of pages calculated by the calculation unit is an even number, and prevent image data corresponding to an even number of blank pages existing between the fixed page image data from being printed when the number of pages calculated by the calculation unit is an odd number.

2. The image processing apparatus according to claim 1, wherein the setting unit is configured to fix the relationship between front and back surfaces of a print sheet in a printing operation for arranging the image data of the plurality of pages on two sides of respective print sheets.

3. The image processing apparatus according to claim 1, wherein the setting unit is configured to fix the relationship between right and left or upper and lower pages of a print sheet in an opened state in a printing operation for arranging the image data of the plurality of pages on two sides of respective print sheets.

4. The image processing apparatus according to claim 1, wherein the setting unit is configured to automatically execute setting of the fixed page image data.

5. The image processing apparatus according to claim 1, wherein the setting unit is configured to execute setting of the fixed page image data according to an instruction of a user.

6. A method for controlling an image processing apparatus, comprising:
inputting image data of a plurality of pages;
setting fixed page image data, as image data of a plurality of consecutive pages whose relationship is to be fixed, among the input image data;
calculating a number of pages of image data corresponding to blank pages that are present between the fixed page image data; and
preventing image data corresponding to all blank pages existing between the fixed page image data from being printed when the number of calculated pages is an even number, and preventing image data corresponding to an even number of blank pages existing between the fixed page image data from being printed when the number of calculated pages is an odd number.

7. A non-transitory computer-readable storage medium storing computer-executable instructions that cause a computer to control an image processing apparatus, the computer-readable instructions comprising:
instructions for inputting image data of a plurality of pages;
instructions for setting fixed page image data, as image data of a plurality of consecutive pages whose relationship is to be fixed, among the input image data;
instructions for calculating a number of pages of image data corresponding to blank pages that are present between the fixed page image data; and
instructions for preventing image data corresponding to all blank pages existing between the fixed page image data from being printed when the number of calculated pages is an even number, and preventing image data corresponding to an even number of blank pages existing between the fixed page image data from being printed when the number of calculated pages is an odd number.

* * * * *